UNITED STATES PATENT OFFICE.

MRS. D. H. McGREGORY, OF DETROIT, MICHIGAN.

IMPROVEMENT IN MAKING BUTTER.

Specification forming part of Letters Patent No. 68,639, dated September 10, 1867.

*To all whom it may concern:*

Be it known that I, Mrs. D. H. McGREGORY, of Detroit, in the county of Wayne and State of Michigan, have invented certain new and useful Improvements in the Process of Making Butter; and I do hereby declare that the following is a full and complete description of the same.

This invention consists in compounding certain well-known and simple articles with a given quantity of common butter, whereby the amount of said butter is increased, and the result of the composition of the materials with the butter produces an article superior in quality to old common butter, and nearly equal in richness and flavor to that newly churned from good cream, and twice the amount, at a cost of less than one-half the original price of the butter.

I take one pint of warm new milk. If not warm from the cow, warm it to about that degree. This measure of milk will weigh about one pound. To this are added, while warm, the yolks of two eggs, which is then thoroughly beaten together until fully and evenly mixed. To this is now added one pound of good common butter. If the butter is hard, soften it to the consistency of that just churned; put the whole into a churn, if the quantity being made is large, or if a small mass, as now under consideration, it may be beaten up in a bowl until the materials have become combined and solid, which will take from ten to fifteen minutes. At this time all the milk will have wholly disappeared, and become incorporated with the butter, and which will now, in appearance, be like new-made butter, possessing the same unadhesive character, so that it will come from the churn freely, leaving nothing behind as a residual product. The butter can now be salted and worked up into rolls or pats in the ordinary way.

The butter thus produced will weigh two pounds and a little over, thus giving one pound of sweet, pleasant, fresh, and wholesome butter for one pint of milk and two eggs, and at a cost only of that of the eggs and milk. It will be hardly necessary to add that the better the quality of the materials used the better will be the result produced; but should the butter employed be of poor quality it is largely improved by being treated in the manner described.

What I claim as my improvement, and desire to secure by Letters Patent, is—

The herein-described way of making butter by the employment of the materials above specified, producing thereby a new article of manufacture.

MRS. D. H. McGREGORY.

Witnesses:
J. H. BURRIDGE,
FRANK S. ALDEN.